US012641360B2

(12) United States Patent
Gruijters et al.

(10) Patent No.:  US 12,641,360 B2
(45) Date of Patent:       May 26, 2026

(54) WIRELESS HEADPHONE SYSTEM WITH STANDALONE MICROPHONE FUNCTIONALITY

(71) Applicant: HARMAN INTERNATIONAL INDUSTRIES, INCORPORATED, Stamford, CT (US)

(72) Inventors: Sebastiaan Gruijters, Hong Kong (CN); Yenfai Chau, Hong Kong (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 318 days.

(21) Appl. No.: 18/088,113

(22) Filed: Dec. 23, 2022

(65) Prior Publication Data

US 2023/0209239 A1      Jun. 29, 2023

Related U.S. Application Data

(60) Provisional application No. 63/294,662, filed on Dec. 29, 2021.

(51) Int. Cl.
 H04R 1/10          (2026.01)
 G06F 3/16          (2006.01)
        (Continued)

(52) U.S. Cl.
 CPC ........... H04R 1/1041 (2013.01); G06F 3/162 (2013.01); H04R 1/1016 (2013.01); H04R 3/00 (2013.01);
        (Continued)

(58) Field of Classification Search
 CPC ..... G06F 3/162; H04R 1/1041; H04R 1/1016; H04R 3/00; H04R 29/008; H04R 2420/07
        (Continued)

(56) References Cited

U.S. PATENT DOCUMENTS

2013/0170665 A1    7/2013   Wise et al.
2021/0076131 A1    3/2021   Minich et al.
                   (Continued)

FOREIGN PATENT DOCUMENTS

CN      109275059 A      1/2019
CN      211481443 U      9/2020
                   (Continued)

OTHER PUBLICATIONS

Extended European Search Report for Application No. 22216858.5 dated May 15, 2023, 7 pgs.

(Continued)

*Primary Examiner* — Katherine A Faley

(74) *Attorney, Agent, or Firm* — BROOKS KUSHMAN P.C.

(57)             ABSTRACT

A wireless headphone system is provided. The system includes a first earbud, a second earbud, and one or more controllers. The first earbud is programmed to wirelessly communicate with a mobile device to playback an audio output in a first ear for a user. The second earbud is programmed to wirelessly communicate with the mobile device to playback the audio output in a second ear from the user. The at least one controller is programmed to determine whether the first earbud or the second earbud has been removed from the first ear or the second ear, respectively, and to enable the user to provide a first audio input into a microphone of the first earbud or the second earbud that is removed from the first ear or the second ear, respectively.

18 Claims, 5 Drawing Sheets

(51) Int. Cl.
  *H04R 3/00*          (2006.01)
  *H04R 29/00*         (2006.01)
(52) U.S. Cl.
  CPC ....... *H04R 29/008* (2013.01); *H04R 2420/07*
                                    (2013.01)
(58) Field of Classification Search
  USPC ................................................... 381/74, 380
  See application file for complete search history.

(56)                References Cited

U.S. PATENT DOCUMENTS

2023/0076666 A1 *   3/2023  Laaksonen .............. H04S 7/308
2023/0379615 A1 *  11/2023  Seo ......................... G06F 3/017

FOREIGN PATENT DOCUMENTS

EP          4175316 A1     5/2023
WO       2021180115 A1     9/2021
WO       2022017469 A1     1/2022
WO       2022080612 A1     4/2022

OTHER PUBLICATIONS

European Office Action dated May 8, 2025 for European Application No. 22216858.5 filed Dec. 28, 2022, 6 pgs.

* cited by examiner

WIRELESS HEADPHONE SYSTEM WITH STANDALONE MICROPHONE FUNCTIONALITY

CROSS-REFERENCE TO RELATED APPLICATIONS

This application claims the benefit of U.S. provisional application Ser. No. 63/294,662 filed Dec. 29, 2021, the disclosure of which is hereby incorporated in its entirety by reference herein.

TECHNICAL FIELD

Aspects disclosed herein generally relate to a wireless headphone system and method for providing microphone functionality. These aspects and others will be discussed in more detail below.

BACKGROUND

True wireless products (or True Wireless Stereo (TWS)) products such as wireless headphones/earbuds are becoming more and more popular, and these products provide a better on-the-go experience since these are no tangling wires between earbuds. However, as the headphone or earbud stays in a user's ears, there is a certain distance between a position of the earbud in the ear and a user's mouth when the wireless product provides microphone capabilities. This typically results in an insufficient in call experience. With a corded or wired headphone, it is possible to bring an in-line microphone that is part of the headphone closer to a user's mouth to improve your voice quality. In addition, it is possible with the wired headphone to increase a user's voice loudness without actually raising your voice. At the same time, a user may speak more softly when the user needs more privacy in a crowded environment and the user does not want to share the content of the conversation with other people that surrounds him or her.

SUMMARY

A wireless headphone system is provided. The system includes a first earbud, a second earbud, and one or more controllers. The first earbud is programmed to wirelessly communicate with a mobile device to playback an audio output in a first ear for a user. The second earbud is programmed to wirelessly communicate with the mobile device to playback the audio output in a second ear from the user. The at least one controller is programmed to determine whether the first earbud or the second earbud has been removed from the first ear or the second ear, respectively, and to enable the user to provide a first audio input into a microphone of the first earbud or the second earbud that is removed from the first ear or the second ear, respectively.

A method is provided that includes wirelessly coupling a first earbud to a mobile device to playback an audio output in a first ear for a user and wirelessly coupling a second earbud to the mobile device to playback the audio output in a second ear from the user. The method further includes determining whether the first earbud or the second earbud has been removed from the first ear or the second ear, respectively; and enabling the user to provide an audio input into a microphone of the first earbud or the second earbud that is removed from the first ear or the second ear, respectively.

A computer-program product embodied in a non-transitory computer readable medium that is programmed for providing an audio output from a wireless headphone system is provided. The computer-program product comprising instructions being executable by at least one controller to wirelessly couple a first earbud to a mobile device to playback the audio output in a first ear for a user and to wirelessly couple a second earbud to the mobile device to playback the audio output in a second ear from the user. The instructions being executable by the at least one controller to determine whether the first earbud or the second earbud has been removed from the first ear or the second ear, respectively, and to enable the user to provide an audio input into a microphone of the first earbud or the second earbud that is removed from the first ear or the second ear, respectively.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein may include any number of microprocessors, integrated circuits, memory devices (e.g., FLASH, random access memory (RAM), read only memory (ROM), electrically programmable read only memory (EPROM), electrically erasable programmable read only memory (EE-PROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Figure 1:
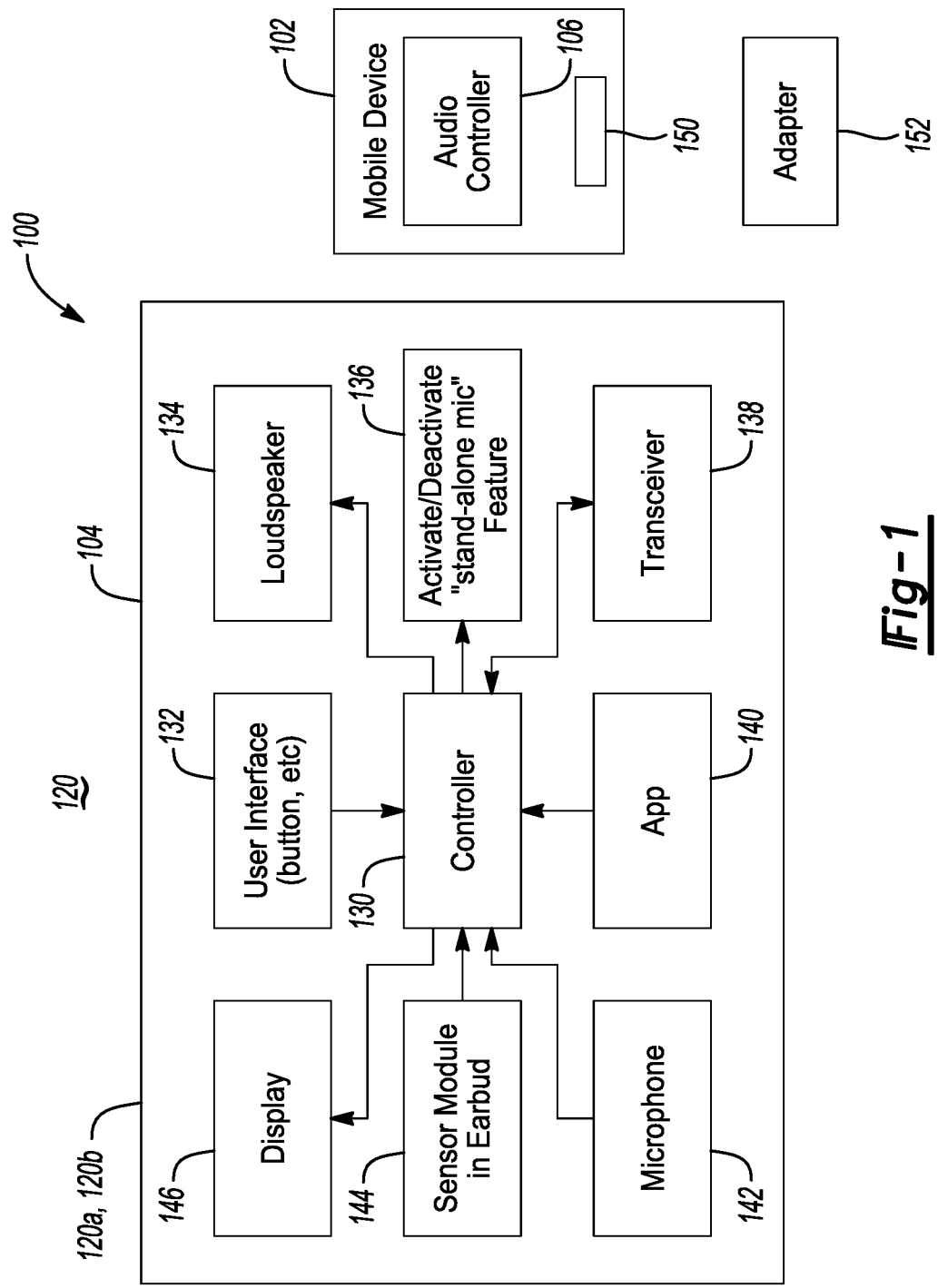
FIG. 1 depicts a schematic of a wireless headphone system in accordance with an embodiment of the present disclosure.

Aspects disclosed herein generally improve the call qual-ity and a call experience when having a call/teleconference/recording via the disclosed wireless headphone system. This may be particularly applicable in a loud environment. When a user is in a busy environment such as, for example, walking on a noisy street and the user receives a call, the user may engage in a teleconference (or the user may be engaged in recording a video and/or audio fragment and speak in order for a mobile device (or other electronic device) that is coupled to the wireless headphones to record video and audio), the user can take one of the headphones (or one of the earbuds) out of his/her ear and place the removed earbud close to their respective mouth or to the sound source to improve the voice/audio quality the user. The wireless earbud (i.e., the remove earbud) may act as a standalone microphone instead of an earbud that plays audio back for the user. Aside from improving the voice quality, the dis-closed wireless headphones may also provide a sense of privacy in a public area where the user does not need to raise his/her voice to ensure the receiving party is hearing what is being input to the removed earbud while in a microphone mode. In general, the wireless headphone system and method may improve call quality (or voice audio reception) when utilized with the headphone system FIG. 1 depicts schematic of a wireless headphone system 100 in accordance with an embodiment of the present disclosure. The system 100 generally includes a mobile device 102 and wireless headphones 104. The mobile device 102 is generally configured to wirelessly transmit an audio input to the headphones 104. The mobile device 102 may wireless communicate with the headphones 104 via a wire-less communication protocol such as, for example, but not limited to Bluetooth or other suitable communication pro-tocol. The type of wireless communication protocol employed may vary based on desired criteria of a particular implementation. The headphones 104 play back the audio input received from the mobile device 102 for the user to listen to.

The mobile device 102 may be implemented as a mobile or cellular phone, a tablet, a laptop, a gaming console or other electronic device that is arranged to transmit audio to a loudspeaker for purposes of playing audio for a user. The mobile device 102 includes an audio controller 106 for generating the audio input that is transmitted to the head-phones 104. While not shown, the mobile device 102 includes a transceiver to bi-directionally communicate with the headphones 104 over the wireless communication pro-tocol.

The headphones 104 generally includes a right earbud 120a and a left earbud 120b. It is recognized that the right earbud 120a may include similar components to that of the left earbud 120b. Hereafter, earbud 120 may be used to correspond to either the right earbud 120a or the left earbud 120b. It is recognized that earbuds as disclosed herein may alternatively be implemented as housings (e.g., a right housing and a left housing) that each includes a loudspeaker and/or a microphone. The earbud 120 generally includes at least one controller 130 (hereafter the controller 130), a user interface 132, a loudspeaker 134, standalone microphone activate/deactivate circuitry 136 (or microphone circuitry 136), at least one transceiver 138 (hereafter the transceiver 138), an application 140 executable by the controller 130, a microphone 142, a sensor 144, and a display 146 (e.g., one or more light emitting diodes (LEDs)).

In an audio playback mode, the transceiver 138 wirelessly receives the audio input from the mobile device 102 and provides the same to the controller 130. The controller 130 processes the audio input and transmits a processed audio signal to the loudspeaker 134 to playback the audio for a user. In this case, the earbud 120 is generally positioned in an ear of the user when the loudspeaker 134 plays back audio for the user. The user interface 132 may be imple-mented as any number of switches or other devices to enable the user to control any number of aspects related to the operation of the earbuds. This aspect will be described in more detail below.

The headphones 104 may also be placed in a microphone mode. For example, the sensor 144 may transmit signals indicative of whether the earbud 120a or 120b is positioned in the user's ear or is outside of the user's ear. In one example, the sensor 144 may be implemented as an infrared (IR) detector (or sensor) 144 and may transmit signals indicative of whether the earbud 120a or 120b is positioned within the ear of the user or taken out of the ear of the user. For example, the sensor 144 (or IR sensor), may be activated when removed from a charging case and can detect whether the sensor 144 is placed in the ear of the user or whether it is not inside the ear of the user. The controller 130 may then processes the signals received from the sensor 144 to determine if the earbud 120 is placed in the user's ear or placed outside of the user's ear. In the event the controller 130 determines that the earbud 120 is positioned outside of the user's ear (or is in the charging case that wirelessly charges the headphones 104) and the other remaining earbud 120 is positioned within the user's other ear based on the signals receives from the sensor 144 in each earbud 120, the controller 130 may activate the microphone mode by execut-ing the application 140 to activate the microphone circuitry 136 which then activates the microphone 142 to receive audio input. The application 140 may be installed on the mobile device 102 or a personal computer (PC). The user may have the option to activate the feature or to deactivate the feature via user selection on the user interface 132 which may be provided by the application 140. It is also possible to adjust the user interface 132 for this feature in the application 140 when executed on the mobile device 102.

In general, the system 100 is in a normal use case when both earbuds 120a, 120b are removed from the user's ears. However, the microphone mode feature may be activated when the Hands-Free Profile (HFP) is activated. The HFP profile indicates whether the mobile device 102 is engaged in a call or is being used to record images. Typically, the user may not take both earbuds 120a, 120b out while engaged in a call or recording images unless special circumstances. The system 100 may enter into the microphone mode when the call is active. In other words, the system 100 activates the microphone mode when a call is being placed or received, or a recording is being performed. The earbuds 120a, 120b may determine whether the earbud 120a, 120b is taken out of the ear or the charging case during a call or recording. When both earbuds 120a, 120b are removed from the user's ears, the system 100 may end the call or recording.

The microphone circuitry 136 may be operably coupled to the user interface 132 via the controller 130. A switch may be selected by the user on the user interface 132 to automatically place the headphones 104 either in the microphone mode or to exit from the microphone mode. In the microphone mode, the controller 130 may convert the received audio input into digital data for transmission to the transceiver 138. The transceiver 138 may then wirelessly transmit the digital data to the mobile device 102. The mobile device 102 may then wirelessly transmit the received digital data over a cellular network to another mobile device that is communicating with the mobile device 102.

In the microphone mode, the earbud 120 that is not in the user's ear turns into a dedicated microphone. The user can bring the earbud 120 closer to his/her mouth and when the user starts talking, the microphone circuitry 136 may amplify the received audio input. The other earbud 120 while still positioned in the user's ear, will perform as a traditional loudspeaker and playback both the received audio from the user of the headphones 104 as well as provide audio from the other party in which the user is communicating with via the mobile device 102. It is recognized that the user may not necessarily be engaged in a communication with another party while the headphones 104 are in the microphone mode. For example, the user may be capturing video via the mobile device 102 and the headphones 104 enable the user to describe a scene or other aspect related to the captured video while in the microphone mode.

The user interface 132 enables the user the ability to select whether the microphone 142 can be muted or unmuted while the headphones 104 are in the microphone mode. In this case, the user selects the option via the user interface 132. The user interface 132 transmits signals indicative of the microphone 142 to be placed in the muted or unmuted state to the controller 130. The controller 130 may then control the microphone circuitry 136 to either place the microphone 142 in the muted or unmuted state. The display 146 may correspond to one or more lighting indicators (e.g., light emitting diode(s)) which may alert the user that the earbud 120 is either in the microphone mode or not in the microphone mode.

When the sensor 144 detects that the earbud 120 has been placed back in the user's ear and the other earbud 120 remains in the user's ear, the headphones 104 is placed into the audio playback mode such that both earbuds 120 plays audio received from the mobile device 102. In the audio playback mode (i.e., both of the earbuds 120 are placed in the user's ear), the controller 130 executes a beamforming algorithm to focus on voice capture and to cancel out environmental noise. It is recognized that the earbud 120 may also capture voice when both earbuds 120 remain in the user's ears. Once the user takes the earbud 120 out of his/her ear and the other earbud 120 remains in the user's ear, the user may place the removed earbud 120 closer to his/her mouth (or sound source) and the controller 130 may then change the beamforming mode to another mode/algorithm (e.g., omni-directional mode) to capture voice input or sound closer to the sound source. In short, the beamforming mode may not be adequate to capture voice or sound when the earbud is positioned too close to the user's mouth (or sound source) as this would provide a less pleasant sound when captured by the microphone 142. In another situation when the user takes out the earbud 120 and placed it back to the charging case, the headphones 104 will place the earbud 120 that is still in the ear in a normal mode where audio playback and voice capture mode is activated.

As noted above, while the mobile device 102 may be mobile or cellular phone, a tablet, a laptop, a gaming console or other electronic device, etc. it is recognized that the mobile device 102 may include any number of ports 150 to receive an adapter 152 that enables wireless communication between the mobile device 102 and the earbuds 120a, 120b. In one example, the adapter 152 may be implemented as a dongle to enable wireless communication between the mobile device 102 and the earbuds 120a, 120b. For example, the dongle may be WI-FI based that provides a mobile broadband connection. Generally, instead of receiving wireless signals from a modem, the dongle may utilize cellular data to enable bi-directional communication between the earbuds 120a, 120b and the mobile device 102. One advantage of utilizing the adapter 150 (e.g., dongle) is that the dongle may enable more faster communication between the mobile device 102 and the earbuds 120a, 120b.

Figures 2A, 2B, 2C:
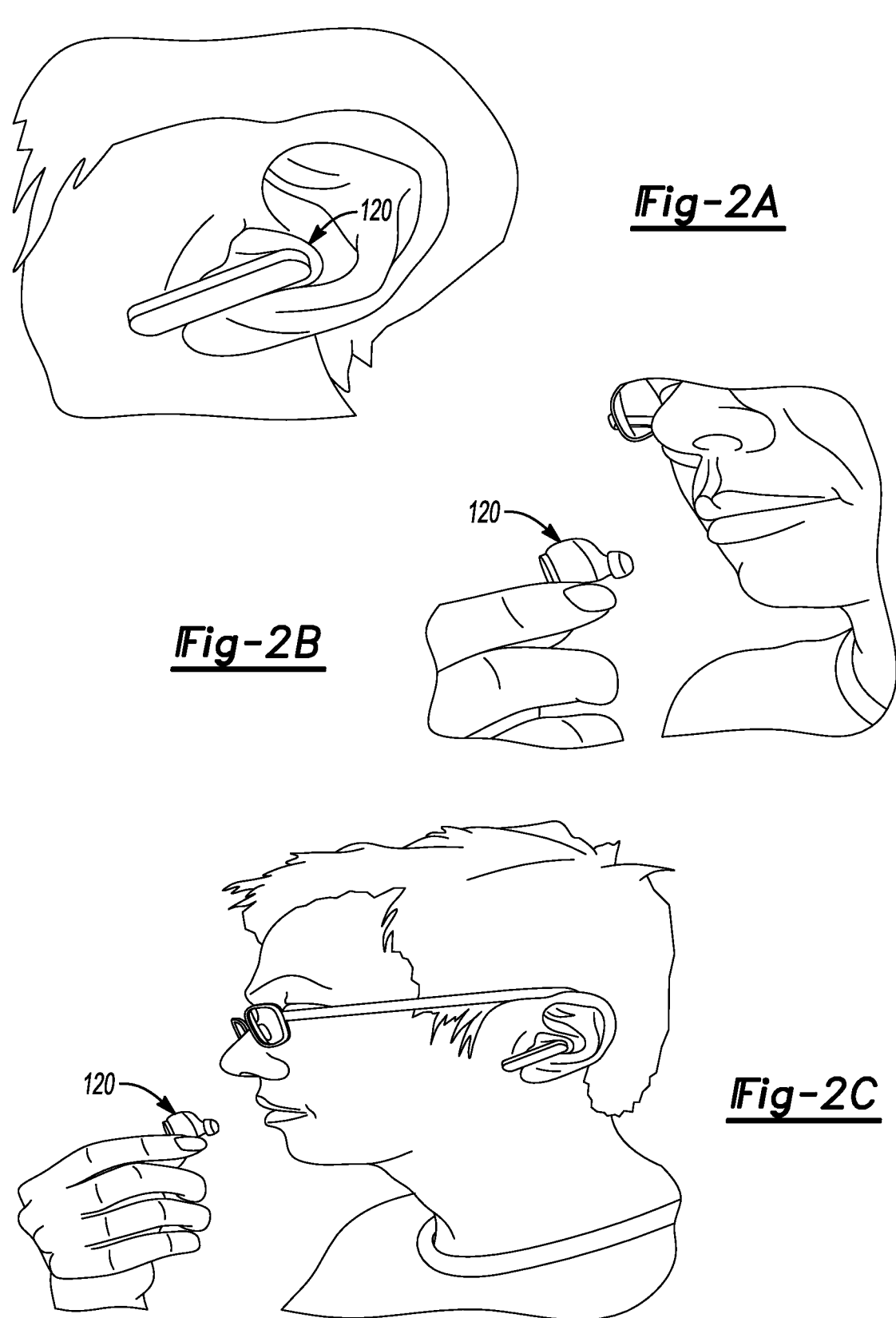
FIG. 2A depicts a first use case in which an earbud of the wireless headphone system is positioned in a user's ear in accordance with an embodiment of the present disclosure.
FIG. 2B depicts a second use case in which the earbud of the wireless headphone system is placed in a microphone mode in accordance with an embodiment of the present disclosure.
FIG. 2C depicts a third use case in which the earbud of the wireless headphone system is placed in which a first earbud is placed in the user's ear and a second earbud is placed in a microphone mode in accordance with an embodiment of the present disclosure.

FIG. 2A depicts a first use case in which an earbud 120 of the wireless headphone system 100 is positioned in a user's ear in accordance with an embodiment of the present disclosure. The first use case may be considered a normal use case where both earbuds 120 will be in both of the user's ears or alternatively, only a single earbud 120 may be positioned in the user's ear (e.g., for listening to music, calls and/or voice recording).

FIG. 2B depicts a second use case in which the earbud 120 of the wireless headphone system 100 is placed in a microphone mode via user selection (e.g., triggering the standalone microphone mode via selection of a switch on the user interface 132 that interfaces with the microphone circuitry 136) in accordance with an embodiment of the present disclosure. In the second use case, it is unnecessary for any of the earbuds 120 to be positioned in the user's ears. The user may bring one of the earbuds 120 closer to his/her mouth to improve or enhance voice capture capabilities and the user optionally can leave the other earbud 120 in the charging case or elsewhere.

FIG. 2C depicts a third use case in which the earbud 120 of the wireless headphone system 100 is placed in a first ear and a second earbud is placed in a microphone mode in accordance with an embodiment of the present disclosure. In this case, one of the earbuds 120 is placed in the user's ear while the other earbud 120 is removed from the other ear. The user may bring the earbud 120 that is removed from the user's ear closer to the user's mouth to receive the audio input while the other earbud 120 that is kept in the user's ear continues to play back audio.

Figure 3:
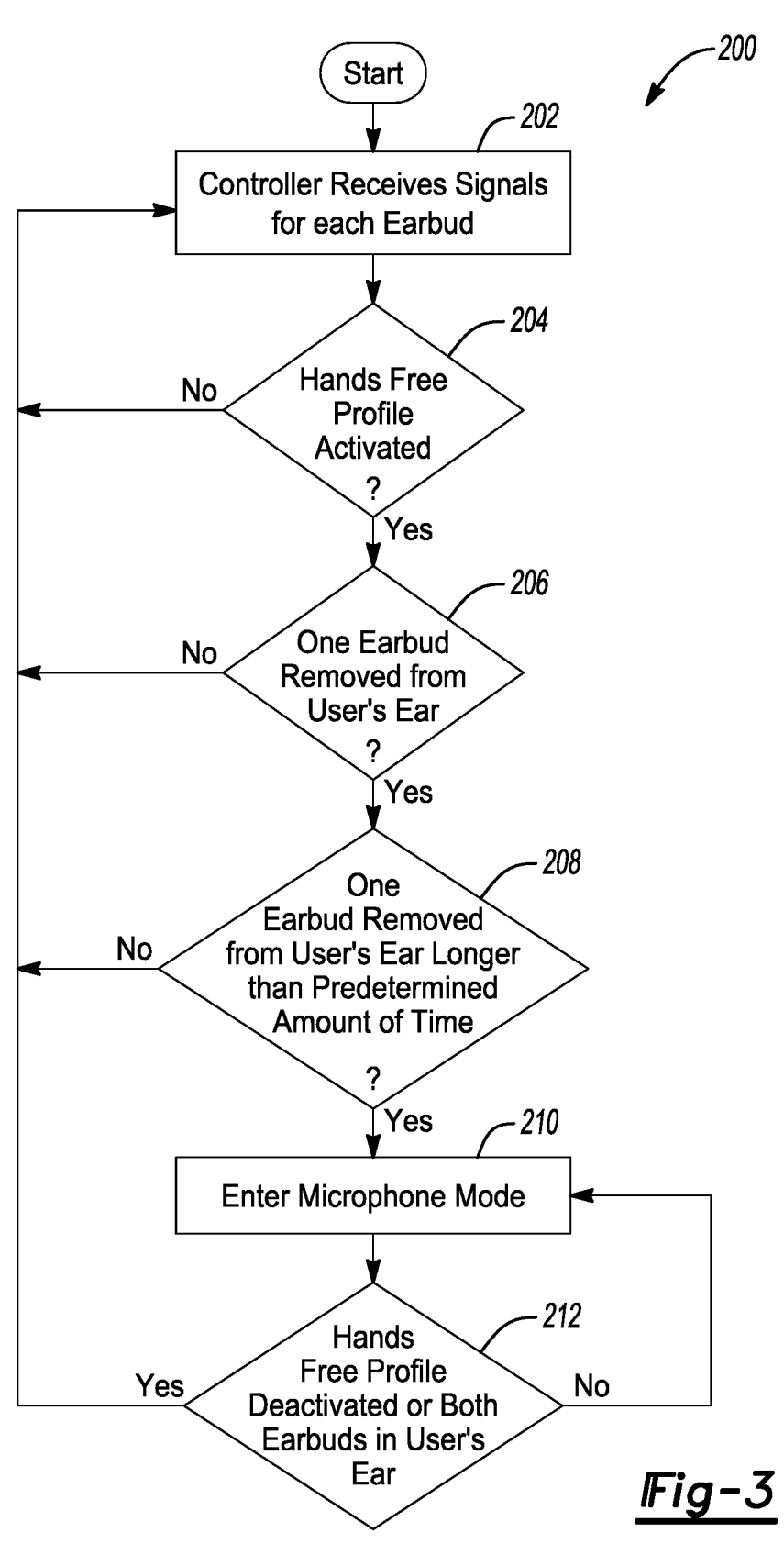
FIG. 3 depicts a method for providing a wireless headphone system with a standalone microphone functionality in accordance with an embodiment of the present disclosure.

FIG. 3 depicts a method 200 for providing the wireless headphone system 100 with a standalone microphone functionality in accordance with an embodiment of the present disclosure.

In operation 202, each controller 130 for each respective earbud 120a, 120b receives a signal from each of their corresponding sensors 144 to monitor whether the earbuds 120a, 120b are positioned in respective ears of the user. In addition, each controller 130 receives signals indicative of whether the earbuds 120a, 120b are removed from a charging case (now shown) which is used to charge the earbuds 120a, 120b. It is recognized that the corresponding earbuds 120a and 120 may communicate with one another over a corresponding wireless transceiver 138 for the purpose of, but not limited to, providing status regarding the position of such earbuds 120a, 120b in the user's ears.

In operation 204, each controller 130 may determine whether the user is in the HFP which is indicative of whether the user is in a call or recording something via the mobile device 102. In this case, the mobile device 102 transmits a signal to each earbud 120a, 120b to notify the earbuds that the mobile device 102 is being used as a phone to either receive or make a phone call. In addition, the mobile device 102 may transmit a signal to each earbud 120a, 120b to notify the earbuds 120a, 120b that the mobile device 102 will be recording images and audio. If the HFP is activated, then the method 200 moves to operation 206. If not, then the method 200 moves back to operation 202.

In operation 206, each controller 130 for a respective earbud 120a, 120b determines whether the respective earbud 120a or 120b is removed from the user's ear. It is recognized that each earbud 120a, 120b provides status regarding the positioning of the earbuds 120a, 120b to be either in the user's ear, or removed from the user's ear to one another. If one earbud 120 is removed from the user's ear and the other remains in the user's ear, then the method 200 moves to operation 208. If not, then the method 200 moves back to operation 202.

In operation 208, the controller 130 for the earbud 120a, 120b that is detected to be removed from the user's ear determines whether the earbud 120a, 120b has been removed for a time period that is greater than a predetermined amount of time. If the earbud 120a or 120b that was removed from the user's ear has not been removed for a period of time that exceeds the predetermined amount of time, then the method 200 moves back to operation 202. If, however, the earbud 120a or 120b that has been removed from the user's ear for a time period that exceeds the predetermined amount of time, then the method 200 moves to operation 210. In this case, it is also recognized that the controller 130 for the earbud 120a, 120b may also monitor to determine if the earbud that 120a, 120b that remains in the user's ear is in the user's ear for a time period that is greater than the predetermined amount of time. Thus, in this regard, the controller 130 may monitors the earbud 120a, 120b to determine if the earbud 120a or 120b that is in the user's ear remains there in excess of the predetermined amount of time and if the earbud 120a or 120b that is removed from the user's ear has been removed therefrom in excess of the predetermined amount of time.

In operation 210, the earbud 120a or 120b that is removed from the user's ear for a time period that exceeds the predetermined amount of time enters into the microphone mode. In the case, the removed earbud 120 will function as a microphone while the earbud 120 that is still in the user's ear will playback audio on the call or that is being recorded for the user to hear. The removed earbud 120 will transition from the beamforming mode to another mode, such as for example, an omnidirectional mode to capture the audio that is being spoken to the microphone 142 of the removed earbud 120.

In operation 212, the earbuds 120a, 120b determines if the call has ended, or the recording has ended which terminates the HFP. In addition, the earbuds 120a, 120b determine if the removed earbud 120a, 120b has been placed back in the user's ear. If either of these conditions are true, then the method 200 moves back to operation 202. If, however, the HFP is still active or the removed earbud 120a or 120b is still removed from the user's ear, then the method 200 moves back to operation 210.

Figure 4:
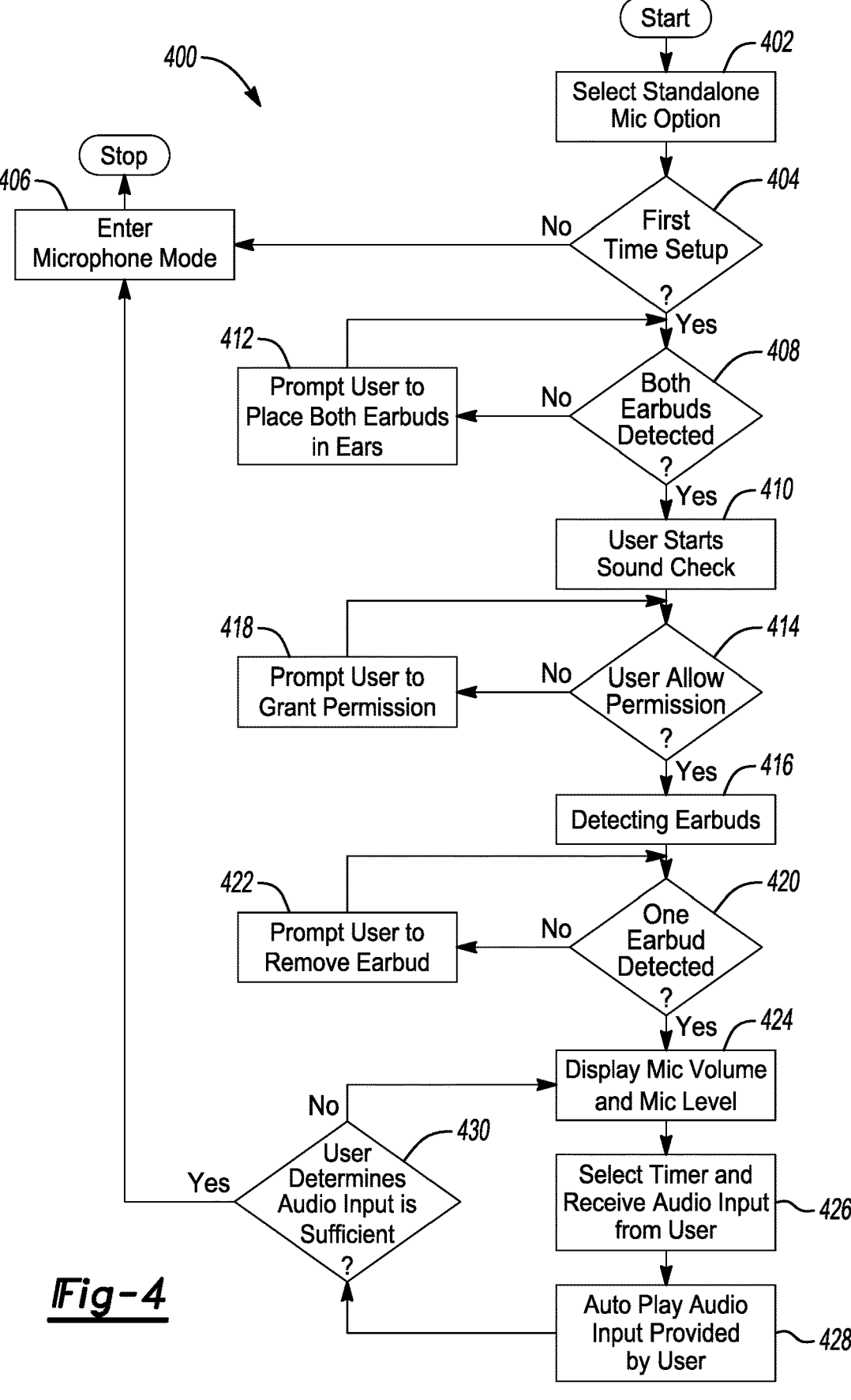
FIG. 4 depicts a method for performing a sound check for the standalone microphone functionality in accordance with an embodiment of the present disclosure.

FIG. 4 depicts a method 400 for performing a sound check for the standalone microphone functionality in accordance with an embodiment of the present disclosure.

In operation 402, the mobile device 102 receives a selection via user input to select the standalone microphone option (e.g., enter the microphone mode). For example, the mobile device 102 provides a menu option on a display thereof for the user to select to enter into the microphone mode. In operation 404, the mobile device 102 determines whether the microphone mode feature has been setup or previously configured by the user. In general, determining whether the microphone mode feature has been setup may entail, among other things, determining if the user has performed a sound check with the one or more earbuds 120a and/or 120b such that audio input provided by the user is received at a microphone level (or volume) that is adequate to ensure that the audio input received by the mobile device 102 can be processed to at level to enable the audio input to be heard by another user on a different mobile device. If the user has setup the microphone mode feature, then the method 400 moves to operation 406 and the user may utilize the microphone mode as set forth in accordance with the method 200 of FIG. 2. If the user has not setup the microphone mode feature, then the method 400 moves to operation 408 to proceed in performing a sound check for one or more of the earbuds 120a or 120b.

In operation 408, the mobile device 102 determines whether both earbuds 120a and 120b have been detected. In particular, the mobile device 102 monitors for signals from the earbuds 120a and 120b to determine whether the earbuds 120a and 120b are detected. If this condition is true, then the method 400 moves to operation 410. If this condition is not true, then the method 400 moves to operation 412.

In operation 410, the mobile device 102 receives a command from the user via the user interface to start or initiate the sound check for the earbuds 120a and/or 120b. In operation 412, the mobile device 102 prompts the user (e.g., visually and/or audibly) to place both earbuds 120a or 120b in their respective ears.

In operation 414, the mobile device 102 determines whether the user has enabled microphone access. If the user has enabled microphone access, then the method 400 moves to operation 416. If not, then the method 400 moves to operation 418. In operation 418, the mobile device prompts the user (e.g., visually or audibly) to enable microphone access. The mobile device 102 provides the mobile access option to the user to grant access to the microphone 146 such that the user records his/her voice and to provide feedback to the user where the voice quality is at an acceptable range in real time.

In operation 416, the mobile device 102 prompts the user (e.g., visually or audibly) to remove one earbud from the user's ear to allow the removed earbud to serve as the microphone. In operation 416, the mobile device 102 detects status of the earbuds in terms of whether the earbud is inserted into the ears.

In operation 420, the mobile device 102 determines whether a single earbud 120a or 120b is removed from the user's ear. If a single earbud 120a or 120b has not been removed, then the method 400 moves to operation 422. If the single earbud 120a or 120b is removed from the user's ear, then method 400 moves to operation 424.

Figure 5:
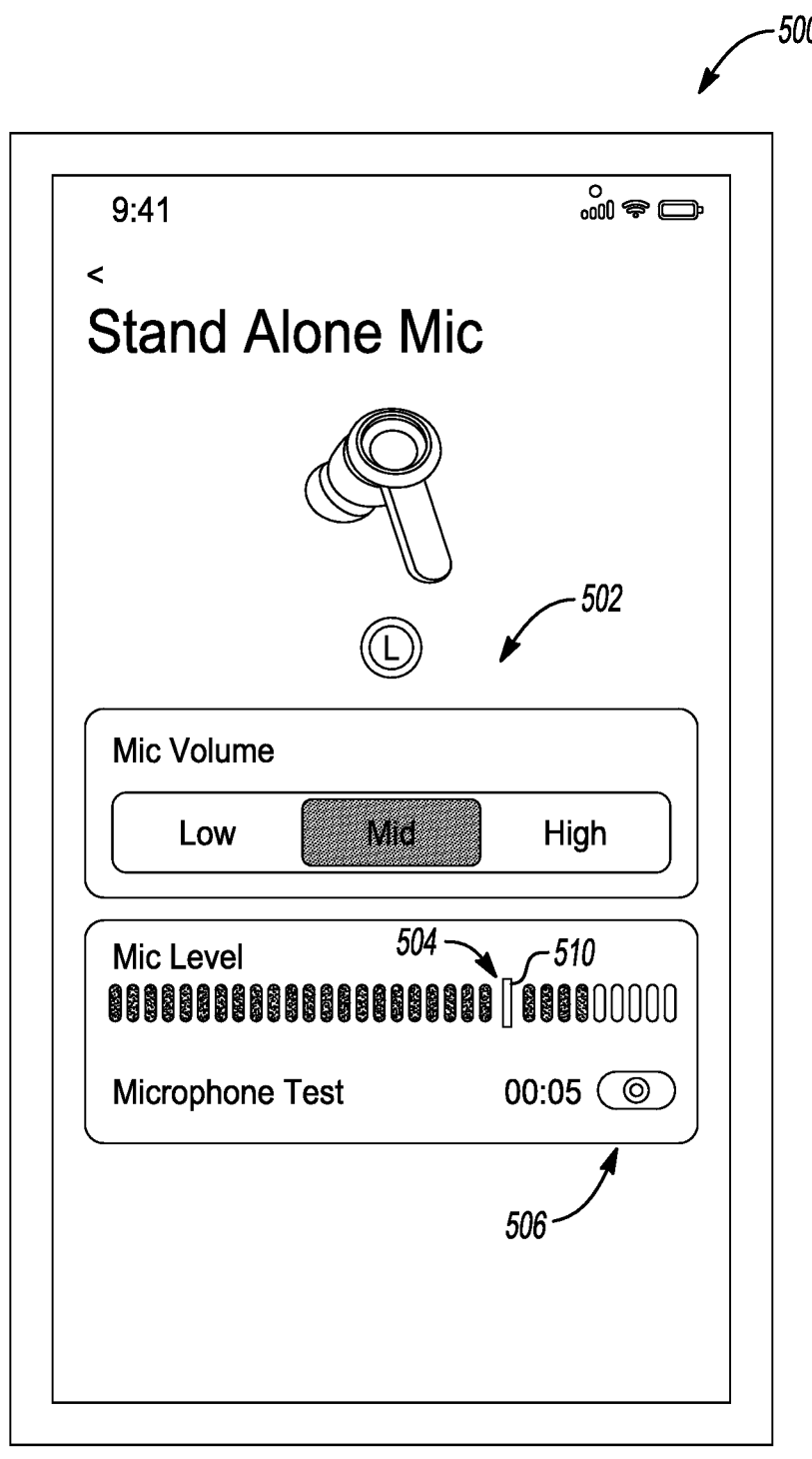
FIG. 5 depicts a view of a standalone microphone display as provided on a mobile device in accordance with an embodiment of the present disclosure.

In operation 422, the mobile device 102 prompts the user (e.g., visually or audibly) to remove one earbud 120a or 120b from their respective ear. In operation 424, the mobile device 102 displays a standalone microphone display 500 (see FIG. 5) that includes a microphone volume field 502, a microphone level field 504, and a microphone timer field 506. The user may select between a low, medium, and high volume for the microphone volume field 502. The microphone volume field 502 may include a "High" selection field for a high-volume selection, a "Medium" selection field for a medium volume selection, and a "Low" selection field for a low volume selection that may be selected by the user. In one example, the mobile device 102 may set the medium volume as a default value.

In operation 426, the mobile device 102 receives an input indicative of the microphone timer field 506 being selected to initiate a timer. In turn, the mobile device 102 may prompt the user to speak into the earbud 120a or 120b that is removed from the ear while the timer is running. In one example, the timer may correspond to 5 seconds. In operation 428, the mobile device 102 receives an audio input from the user. The mobile device 102 illustrates the microphone level on the microphone level field 504. The microphone level field 504 includes an indicator 510 to provide an indication to the user that the volume at which the user is speaking and the location of the earbud 120a or 120b relative to the user's mouth is satisfactory or not. In operation 430, upon the timer expiring, if the microphone level field 504 of the mobile device 102 indicates that the level at which the audio has been recorded exceeds the indicator (e.g., the recorded audio level is positioned to the right of the indicator 510), then the volume and/or location of the earbud 120a or 120b being used as the microphone is adequate. In this case, the method 400 moves to operation 406 to enable the user to engage in the microphone mode, where the user can engage in a call with another individual while talking into the earbud 120a or 120b. If, upon the timer expiring, and the microphone level field 504 of the mobile device 102 indicates that the level at which the audio has been recorded falls below the indicator 510 (e.g., the recorded audio level is positioned to the left of the indicator 510), then the volume and/or location of the earbud 120a or 120b relative to the user's mouth being used as the microphone is inadequate. In this case, the method 400 moves back to operations 424, 426, 428, and 430 for re-execution to ensure that the audio input provided by the user to the earbud 120a or 120b as the microphone is at an adequate level.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wireless headphone system comprising:
a first earbud programmed to playback an audio output in a first ear for a user;
a second earbud programmed to playback the audio output in a second ear from the user;
a mobile device programmed to:
    wirelessly transmit the audio output to the first earbud and the second earbud;
    detect that the first earbud is positioned in the first ear and that the second earbud is positioned in the second ear prior to performing a sound check;
    prompt the user to remove the first earbud from the first ear;

receive a first audio input, from the user, at a microphone of the first earbud that is removed from the first ear;
perform the sound check on the first audio input that is received at the microphone of the first earbud that is removed from the first ear;
at least one controller of at least one of the first earbud and the second earbud programmed to:
determine whether the first earbud has been removed from the first ear after performing the sound check; and
receive a second audio input, from the user, at the microphone of the first earbud that is removed from the first ear such that the wireless headphone system operates in a microphone mode.

2. The system of claim 1, wherein the at least one controller is further programmed to enable the user to listen to the second audio input via the second earbud that remains positioned in the second ear.

3. The system of claim 1, wherein the at least one controller is further programmed to determine whether the user is engaged in a voice call with the mobile device or whether the mobile device is capturing an image of an object prior to the user providing the second audio input into the microphone of the first earbud.

4. The system of claim 3, wherein the at least one controller is further programmed to activate the microphone of the first earbud to receive the second audio input in response to the user being engaged in the voice call with the mobile device or the mobile device capturing the image of the object.

5. The system of claim 1, wherein the at least one controller is further programmed to receive the second audio input at the microphone of the first earbud at least in response to the first earbud being removed from the first ear for a first time period.

6. The system of claim 5, wherein the at least one controller is further programmed to receive the second audio input at the first earbud in response to the first earbud being removed from the first ear for the first time period and the second earbud remaining in the second ear for a second time period.

7. The system of claim 1, wherein one or more of the first earbud and the second earbud are further programmed to wirelessly communicate with the mobile device via an adapter.

8. The system of claim 7, wherein the adapter is a dongle.

9. The system of claim 1, wherein the mobile device is further programmed to initiate a timer and to receive a third audio input from the microphone of the first earbud or a microphone of the second earbud to display a microphone level for the microphone of the first earbud and a microphone level for the second earbud prior to the timer expiring.

10. The system of claim 9, wherein the mobile device is further programmed to display the microphone level for the third audio input at least one of while the timer is running and after the timer has expired.

11. A method comprising:
transmitting an audio output by a first earbud into a first ear for a user;
transmitting the audio output by a second earbud into a second ear for the user;
wirelessly transmitting the audio output to the first earbud and the second earbud;
detecting that the first earbud is positioned in the first ear and that the second earbud is positioned in the second ear prior to performing a sound check;

prompting the user to remove the first earbud from the first ear;

receiving a first audio input, from the user, at a microphone of the first earbud that is removed from the first ear;

performing the sound check on the first audio input that is received at the microphone of the first earbud that is removed from the first ear;

determining by, at least one controller of at least one of the first earbud and the second earbud, whether the first earbud has been removed from the first ear or the second ear, respectively, after performing the sound check; and receiving a second audio input, from the user, at the microphone of the first earbud that is removed from the first ear such that a wireless headphone system operates in a microphone mode.

12. The method of claim 11 further comprising enabling the user to listen to the second audio input via the second earbud that remains positioned in the second ear, respectively.

13. The method of claim 11 further comprising determining whether the user is engaged in a voice call with a mobile device or whether the mobile device is capturing an image of an object prior to the user providing the second audio input into the microphone of the first earbud.

14. The method of claim 13 further comprising activating the microphone of the first earbud to receive the second audio input in response to the user being engaged in the voice call with the mobile device or the mobile device capturing the image of the object.

15. The method of claim 11 further comprising receiving the second audio input at the first earbud at least in response to the first earbud being removed from the first ear for a first time period.

16. The method of claim 15 further comprising receiving the second audio input at the first earbud in response to the first earbud being removed from the first ear for the first time period and the second earbud remaining in the second ear for a second time period.

17. The method of claim 11 further comprising wirelessly coupling the first earbud and the second earbud to a mobile device via a dongle.

18. A wireless headphone system comprising:

a first earbud for being positioned about a first ear of a user;

a second earbud for being positioned about a second ear of the user;

a mobile device programmed to:

wirelessly transmit an audio output to the first earbud and the second earbud to playback the audio output in the first ear and the second ear, respectively;

detect that the first earbud is positioned in the first ear and that the second earbud is positioned in the second ear prior to performing a sound check;

prompt the user to remove the first earbud from the first ear;

receive a first audio input, from the user, at a microphone of the first earbud that is removed from the first ear;

perform the sound check on the first audio input that is received at the microphone of the first earbud that is removed from the first ear; and at least one controller of at least one of the first earbud and the second earbud programmed to:

determine whether the first earbud has been removed from the first ear after performing the sound check; and receive a second audio input, from the user, at the microphone of the first earbud that is removed from the first ear such that the wireless headphone system operates in a microphone mode.

* * * * *